Nov. 13, 1928.
C. C. C. BURKHARDT ET AL
1,691,797
LOCOMOTIVE CAB DECK
Filed Nov. 10, 1927  3 Sheets-Sheet 3
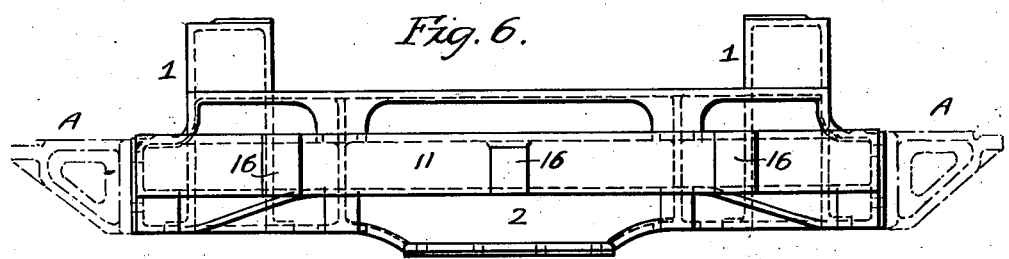
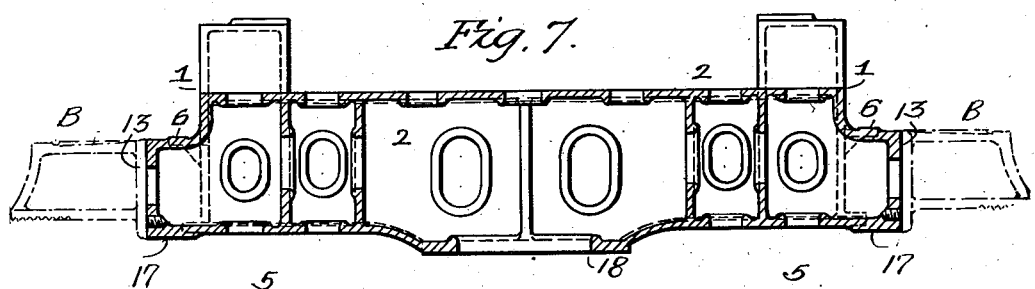
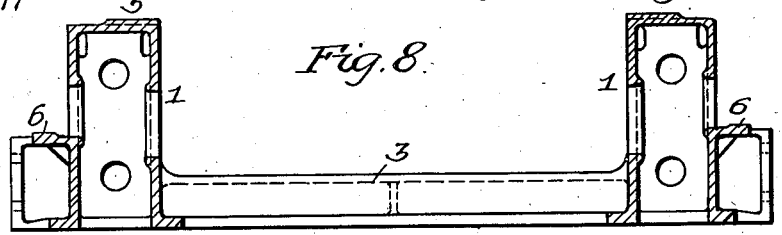
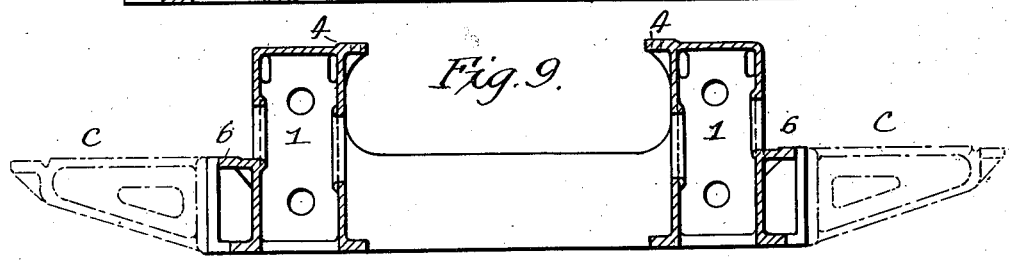
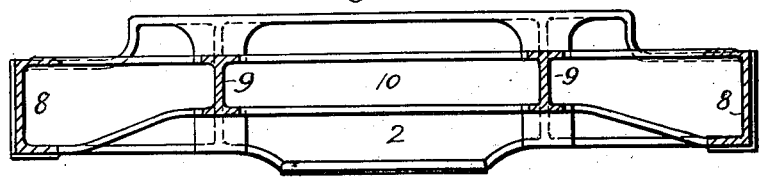
Inventors:
Conrad C. C. Burkhardt,
Edward O. E. Ucoll,
by their Attorneys, Patented Nov. 13, 1928.

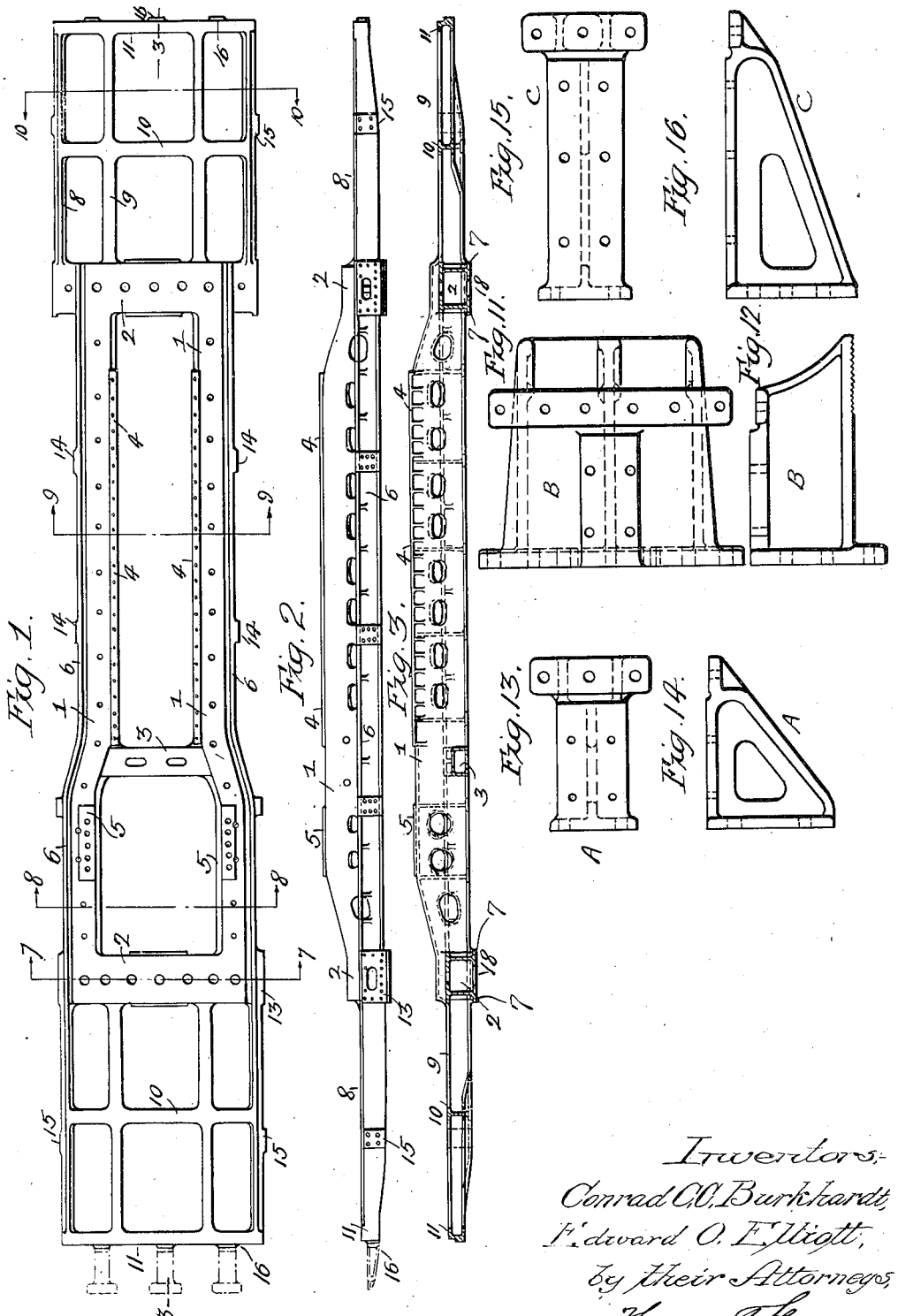

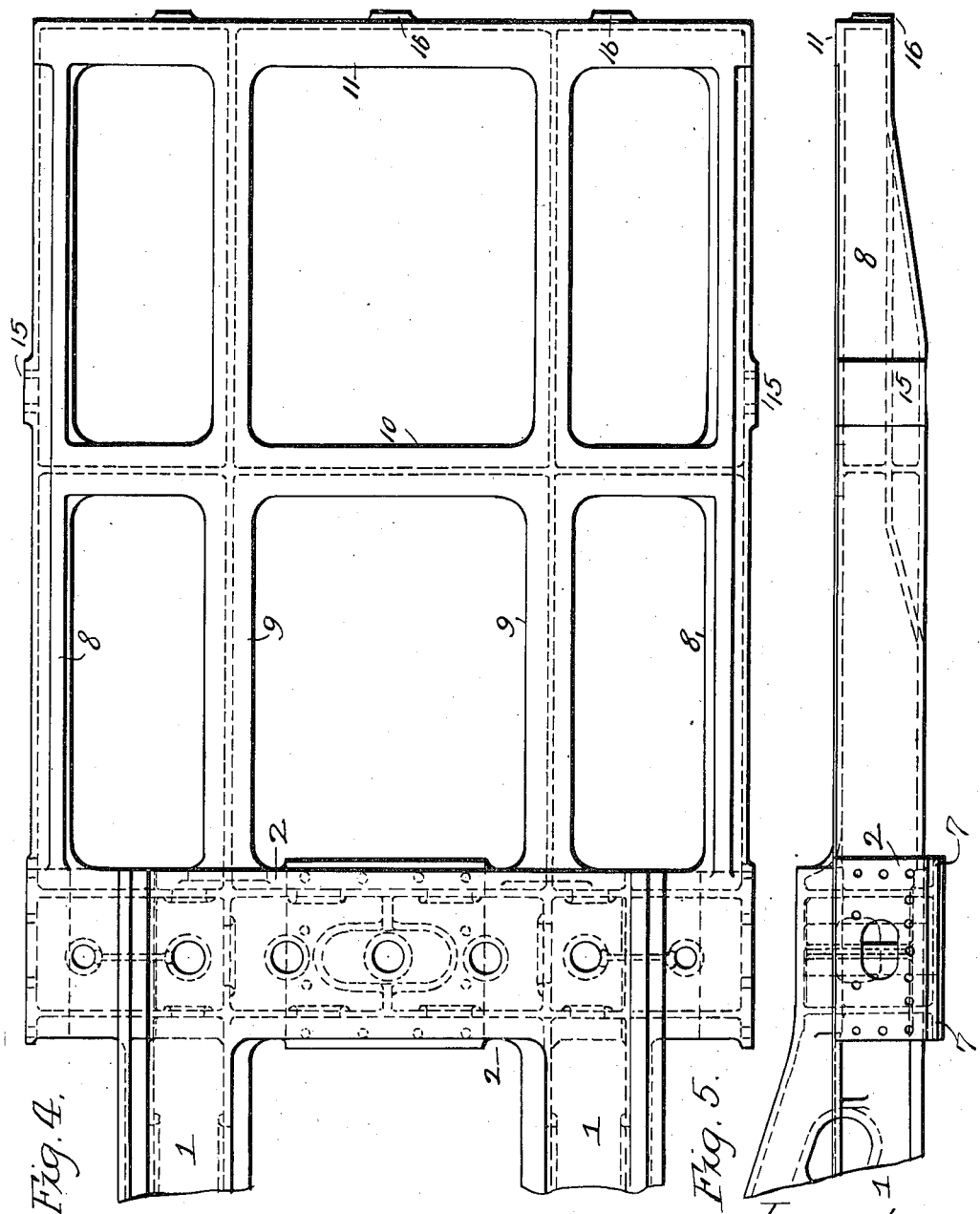

1,691,797

UNITED STATES PATENT OFFICE.

CONRAD C. C. BURKHARDT AND EDWARD O. ELLIOTT, OF PHILADELPHIA, PENNSYLVANIA.

LOCOMOTIVE CAB DECK.

Application filed November 10, 1927. Serial No. 232,391.

Our invention relates to certain improvements in the bed frame or cab deck of an internal combustion-electric locomotive. In this type of locomotive the internal combustion engine drives an electric generator, and the generator in turn transmits power to the motors on the trucks of the locomotive.

The object of our invention is to simplify the form of the cab deck or bed frame by making it in an integral casting. In the present instance, certain brackets are added to the frame where it is desired to extend the width of the frame at certain parts, but the main body of the frame is an integral casting, and the brackets in some instances may be made integral with the frame.

In the accompanying drawings:

Fig. 1 is a plan view of a cab deck or bed frame of an electric locomotive illustrating our invention;

Fig. 2 is a side view;

Fig. 3 is a longitudinal sectional view on the line 3—3, Fig. 1;

Fig. 4 is an enlarged plan view of one end of the frame;

Fig. 5 is an enlarged side view of the said end shown in Fig. 4;

Fig. 6 is an end view of the frame;

Fig. 7 is a sectional view on the line 7—7, Fig. 1;

Fig. 8 is a sectional view on the line 8—8, Fig. 1;

Fig. 9 is a sectional view on the line 9—9, Fig. 1;

Fig. 10 is a sectional view on the line 10—10, Fig. 1;

Fig. 11 is a plan view of one of the brackets which is attached to the frame;

Fig. 12 is a side view of the bracket shown in Fig. 11;

Fig. 13 is a plan view of another bracket;

Fig. 14 is a side view of the side bracket shown in Fig. 13;

Fig. 15 is still another form of bracket; and

Fig. 16 is a side view of the bracket shown in Fig. 15.

The cab deck or bed frame, in the present instance, is arranged to be mounted on two trucks which are equipped with electric motors. The frame is mounted on the usual centre bearing plates. In the frame for an internal combustion-electric locomotive in which the electric generator is driven by an internal combustion engine, it is desirable that the frame be very substantial and simple in construction.

1—1 are the two main sills of the bed frame, which extend from one transverse body bolster 2 to the other body bolster as clearly shown in Fig. 1. The weight of the engine and electric generator is distributed evenly over the sills between the two transoms. The required depth of the sills can usually be obtained by utilizing the upwardly extending portions of the sills necessary to locate the bed flanges and pads at a suitable height. In this way, the underside of the main sills 1—1 will be well above the trucks, permitting easy access to them as well as other auxiliaries located on the underside of the frame.

The main sills are shown in the present instance as having an inverted U-shaped cross-section. This gives the best distribution of metal consistent with an open casting providing the greatest facilities for inspection, painting and repairs.

While we prefer the U-shaped form, it is obvious that a box form could be used in place of the inverted U, but this box form, while it will give sufficient strength, could not be readily cast nor inspected.

3 is a cross-tie which extends from one main sill to the other at a point where change of direction occurs to counteract the slight eccentricity in loading.

The main sills have bolting flanges 4, on which the internal combustion engines are mounted and to which the bed frame of the engine is secured. The electric generator is mounted on the pads 5 beyond the cross-tie.

Suitable ribs are formed between the walls of the main sills 1—1, as shown in the drawings, to add strength to the structure, and extending on the outer side of each main sill is a flange 6, upon which rests the inner edges of the cab floor plates. These cab floor plates are also supported by brackets shown in Figs. 13 to 16 inclusive.

The transoms or body bolsters are of box section with extended flanges 7, to which are joined the main sills 1—1 and cantilever sills 8 and 9. The underside of each bolster has a finished pad 18, to which the centre plate is bolted, although in some instances the centre plate may be cast integral with the transoms, without departing from the essential features of the invention.

The outer ends of the cab are supported by the sills 8 and 9 of channel or I section, extending between the transoms 2 and the end sills 11 and braced intermediately with cross-ties 10. The upper surfaces have finishing pads or surfaces upon which rest the floor plates.

In the present instance the side sills of the cab are supported by brackets such as shown in Figs. 11 to 16 inclusive, and these brackets are bolted to suitable flanges or pads 13, 14 and 16 on ends of the transoms and sides of sills, although in some instances these brackets may be an integral part of the casting.

The brackets "B" are attached to the pad 13 on the end of the transom, Fig. 7, and are of rugged construction, as the frame may be jacked and lifted up through the medium of these brackets.

The brackets "A" and "C" are of lighter section and are intended to support the cab sills only. The pads 16 at the ends of the cab deck or bed frame are for the purpose of bolting the platform brackets thereto as shown in dotted lines in Figs. 1 and 2. This is done in order to not unduly increase the length of the casting, but in some instances the brackets may be made integral with the frame.

The pads 17 on the underside of the transoms at each outer end are for attaching side bearing liners.

A cab deck or bed frame made in accordance with the above description and as illustrated in the drawings is very substantial and comparatively light, and can be readily cast.

Suitable openings are provided throughout the frame for the purpose of lightening the structure and so that access may be had to the interior portions of the frame.

We claim:

1. A cab deck of an internal combustion-electric locomotive, said deck extending from one end of the locomotive to the other, said deck being reduced in width at the centre and at a point where the internal combustion engine is located and enlarged at one end for the accommodation of the electric generator, the main portion of the deck being between two transoms; and integral extensions at each end in the form of sills for supporting the ends of the cab.

2. A cab deck for an internal combustion-electric locomotive having two transoms spaced apart, said transoms being arranged to receive centre bearing plates which are supported by the trucks; two longitudinal main sills arranged comparatively close together throughout the major portion of their length and the width being increased at one end; a cross-tie extending from one sill to the other at a point where change in direction occurs; bolting flanges on which the engine is mounted; and pads on the wider portion on which the generator is mounted, said frame having sills beyond the bolster for supporting the outer ends of the cab.

3. A cab deck for an internal combustion-electric locomotive having two transoms spaced apart, said transoms being arranged to receive centre bearing plates which are supported by the trucks; two longitudinal main sills arranged comparatively close together throughout the major portion of their length and the width being increased at one end; a cross-tie extending from one sill to the other at a point where change in direction occurs; bolting flanges on which the engine is mounted; and pads on the wider portion on which the generator is mounted, said frame having sills beyond the bolster for supporting the outer ends of the cab, said sills having an outer flange on which rest the inner edges of the cab floor plates.

4. A cab deck for an internal combustion-electric locomotive having two longitudinal sills and transoms, the sills being connected by a cross-tie where a change of direction occurs, the upper portion of the structure being arranged to carry the internal combustion engine, and the wider portion arranged to carry the electric generator; and pads at the sides of the sills to which brackets may be secured, said frame having extensions at each end for supporting the ends of the cab.

5. The combination in a cab deck of an internal combustion-electric locomotive adapted to be mounted on trucks, said deck having two transoms provided with pads to which centre plates are secured and two sills, said sills being elevated between the transoms and forming supports for the internal combustion engine and the electric generator.

6. The combination in a cab deck of an internal combustion-electric locomotive, said deck having two transoms and two sills, said sills being elevated between the transoms and forming supports for the internal combustion engine and the electric generator; and extensions at each end of the deck beyond the transoms for supporting the ends of the cab.

7. The combination of an integral cab deck for an internal combustion-electric locomotive, having two transoms, and two parallel sills extending from one transom to the other, said sills being comparatively close together and forming the support for the internal combustion engine and the generator; end extensions beyond the transoms for supporting the ends of the cab; and brackets projecting from the deck for supporting the cab.

CONRAD C. C. BURKHARDT.
EDWARD O. ELLIOTT.